Patented Aug. 27, 1940

2,213,131

UNITED STATES PATENT OFFICE 2,213,131

PURIFICATION OF MASSES CONTAINING CALCIUM HYDROXIDE

Karl Wintersberger and Walter Spormann, Ludwigshafen-on-the-Rhine, Germany, assignors to I. G. Farbenindustrie Aktiengesellschaft, Frankfort-on-the-Main, Germany No Drawing. Application January 17, 1939, Serial No. 251,336. In Germany January 21, 1938

5 Claims. (Cl. 23—186)

The present invention relates to the purification of masses containing calcium hydroxide.

In the preparation of acetylene from calcium carbide, there is obtained as a by-product calcium hydroxide which is contaminated by the accompanying constituents of the initial material, as for example the ash constituents of the coke. The use of the said by-product for industrial purposes is greatly limited by reason of the said contaminating impurities.

We have now found that the major portion of the said impurities can be removed readily by a treatment with alkali hydroxide solutions. Contrasted with the usual processes for decomposing mineral substances with alkalies, high temperatures and/or pressures are not necessary in this case. On the contrary it is possible to bring the impurities into solution at relatively low temperatures and at ordinary pressure by stirring the mass with the said solutions. Ordinary temperature may even be used; the duration of the treatment may be shortened by slight heating.

Aqueous caustic soda solution containing not more than 10 per cent of sodium hydroxide has proved especially suitable, but stronger or more dilute solutions may be used.

The following examples will further illustrate how the said invention may be carried out in practice, but the invention is not restricted to these examples. The parts are by weight.

Example 1

1 part of calcium hydroxide mass obtained in the preparation of acetylene from calcium carbide, which mass after being heated to glowing contains about 89 per cent of CaO, is stirred with 4 parts of a 4 per cent aqueous caustic soda solution for 2 hours at about 60° C. The solids are then separated from the liquid and washed. The product obtained contains 96 per cent of CaO after being heated to glowing.

Example 2

1 part of a calcium hydroxide mass obtained in the preparation of acetylene from calcium carbide, which mass after being heated to glowing contains 90.2 per cent of CaO, 4.0 per cent of $Al_2O_3$, 1.9 per cent of $Fe_2O_3$, 3.2 per cent of $SiO_2$ and 0.5 per cent of $SO_3$, is stirred with 4 parts of a 4 per cent aqueous caustic soda solution for 2 hours at about 60° C. The solids are separated from the liquid and washed. 90.5 per cent of the calcium hydroxide mass used are obtained in purified form. The final product contains after being heated to glowing 93.8 per cent of CaO, 2.9 per cent of $Al_2O_3$, 1.0 per cent of $Fe_2O_3$ and 2.6 per cent of $SiO_2$.

We claim:

1. A process for purifying the calcium hydroxide masses obtained in the preparation of acetylene from calcium carbide which consists in treating the masses with alkali metal hydroxide solutions and separating the solids.

2. A process for purifying the calcium hydroxide masses obtained in the preparation of acetylene from calcium carbide which consists in stirring the masses with alkali metal hydroxide solutions at elevated temperatures and separating the solids.

3. A process for purifying the calcium hydroxide masses obtained in the preparation of acetylene from calcium carbide which consists in stirring the masses with alkali metal hydroxide solutions at elevated temperatures and separating and washing the solids.

4. A process for purifying the calcium hydroxide masses obtained in the preparation of acetylene from calcium carbide which consists in stirring the masses with a slightly heated solution containing not more than about 10% of sodium hydroxide and separating and washing the solids.

5. A process for purifying the calcium hydroxide masses obtained in the preparation of acetylene from calcium carbide which consists in stirring one part of the said masses with four parts of a 4 per cent aqueous sodium hydroxide solution at about 60° C. and separating and washing the solids.

KARL WINTERSBERGER.
WALTER SPORMANN.